Nov. 26, 1963 — T. H. WRIGHT — 3,112,112
OIL SEAL FOR AUTOMOTIVE CRANK SHAFTS
Filed April 28, 1961
FIG.1.
FIG.3.
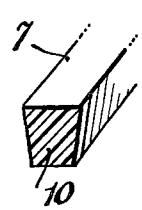
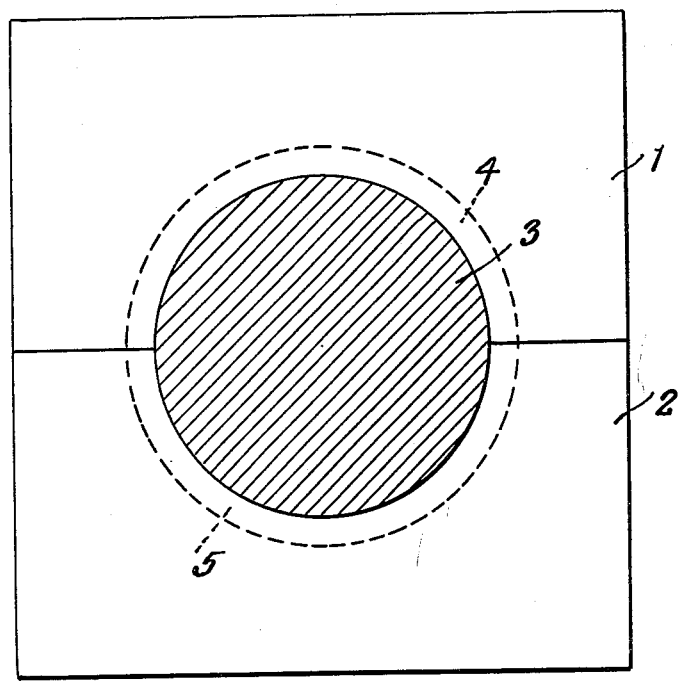
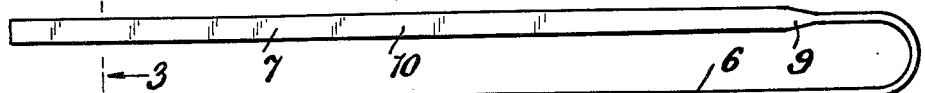
FIG.2.
FIG.4.
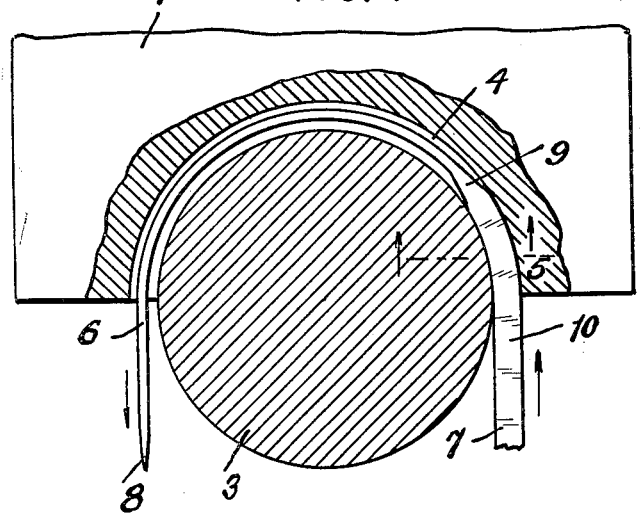
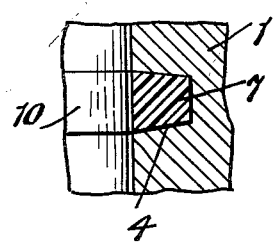
FIG.5.
INVENTOR
Thomas H. Wright
BY James K. Lyles
ATTORNEY United States Patent Office 3,112,112
Patented Nov. 26, 1963

3,112,112
OIL SEAL FOR AUTOMOTIVE CRANK SHAFTS
Thomas H. Wright, 4242 SW. 62nd Ave., Miami, Fla.
Filed Apr. 28, 1961, Ser. No. 106,277
1 Claim. (Cl. 277—11)

This invention relates to sealing means for split bearings and particularly those of the type employed for example, in automotive engines, and has for one of its objects the provision of a sealing strip which can be easily and quickly positioned in a groove in the bearing without requiring removal or displacement of the crankshaft or other rotatable element operative in the bearing.

In engine construction wherein split bearings receive the crankshaft, the replacement of sealing material in a groove in one-half of the bearing is difficult since the front of the groove is covered by the crankshaft. As a result the sealing material can only be inserted in the groove by entering it through one or the other of the ends of the groove. Since it is desirable that the sealing material closely and fully fill the groove in the bearing, it follows that the filling of the groove by the conventional entry of the sealing material from one end is difficult, time-consuming and not always effective.

It is therefore one of the objects of the invention to provide a sealing strip which can be easily inserted from one end of the groove in the bearing to fully and completely fill the groove; which will be provided with an easy-threading end portion or leader that freely slips through the groove and extends out of one end thereof and can be manually pulled to draw into the groove a part of the strip which fully and completely fills the groove for its length and constitutes the sealing element therefor.

It is an object of the invention to provide a sealing stip of one-piece, continuous form consisting of a lengthy piece having a narrow leading end portion and a thicker trailing portion formed integrally therewith, the leading portion being smaller in transverse size than the transverse size of the groove, so that said leading portion can be readily slid through the groove, and with the thicker portion of a size closely conforming to the interior of the groove and caused to be drawn into the groove to fill the same by pull imposed on an end of the narrow portion that projects out of an end of the groove.

With these and other objects to be hereinafter set forth in view, I have devised the arrangement of parts to be described and more particularly pointed out in the claim appended hereto.

In the accompanying drawing, wherein an illustrative embodiment of the invention is disclosed, FIG. 1 is a front elevational view of a diagrammatically-illustrated split bearing in which a sealing strip of the present invention is adapted to be inserted;

FIG. 2 is a face view of the sealing strip;

FIG. 3 is a transverse sectional view through the sealing strip on the line 3—3 of FIG. 2, looking in the direction of the arrows;

FIG. 4 shows the half section of the split bearing to which the sealing strip is to be applied, showing parts of the bearing in section and showing the sealing strip partly inserted in the groove in the bearing, and FIG. 5 is a sectional view on the line 5 of FIG. 4, looking in the direction of the arrows.

Referring to the drawing, 1 and 2 indicate respectively, the two sections of a split bearing, 1 designating the upper half of the bearing and 2 the lower half. Bearings of this kind are used in internal combustion engines as crankshaft bearings, and the two sections shown at 1 and 2 are diagrammatic representations since bearings of this kind are made in various forms and the present invention does not relate to the external configuration of any particular bearing. In most of these bearings, the lower half 2 of the bearings is easily removable, and the arcuate section 5 of the facial groove is thus rendered easily accessible for the removal and replacement of the sealing strip contained within the groove. The upper half 1, having its groove 4 covered by the crankshaft 3 or other rotative element operative in the bearing, can only have its groove 4 filled by suitable sealing material insertable from one or the other of the ends of the groove, and such insertion is ordinarily difficult and not readily and effectively performed.

The two sections 1 and 2 of the bearing fit together to embrace the rotating element such as the crankshaft 3 between them, and when the two sections 1 and 2 are so fitted together, the arcuate groove sections 5 and 4, containing the sealing material, encircle the crankshaft.

As previously stated, the lower half 2 of the bearing is removable, but the upper half 1 remains mounted over the crankshaft so that the replacement of the sealing material in its groove 4 in the conventional way is a difficult task.

A sealing material which can be easily inserted in the groove 4 in the upper half of the bearing is shown in FIG. 2. It will be there seen that the sealing material consists of a lengthy strip of a suitable packing or sealing substance 7, such as a suitable flexible and compressible plastic having longitudinal elasticity, said strip having a forward end portion 6 of relatively slender form and considerably smaller in cross-sectional size than the interior of the groove 4, which groove is shown as being of keystone formation in cross-sectional shape. This slender, flexible end portion 6 is of such size that it is readily threadable through the groove 4 and slides freely therethrough. At its forward end it can be pointed or tapered as shown at 8 and at its opposite end it gradually widens as shown at 9 to integrally merge with a part 10 of considerable length and of a cross-sectional shape and size which conforms substantially to the interior shape of the groove 4. This part 10 is of the keystone shape of the groove 4, if the groove is of such shape, as is shown in FIG. 5.

The narrow or thinner part 6 of the strip thus constitutes the leading end and the part 10 constitutes the trailing end and both parts of the strip are integrally formed of a flexible packing or sealing material.

The manner in which the improved sealing strip is inserted in the groove 4 in the upper half of a split bearing, will be apparent from FIG. 4. The old packing or sealing material is forced out of the groove 4 and then the end 8 of the sealing strip 7 is inserted in one end of the groove 4, such as the end thereof shown at the right in FIG. 4. The narrow part 6 of the strip is then urged along in the groove, and due to its small cross-sectional size as compared to the transverse size of the groove, it will freely slide through the groove, its movement longitudinally of the groove being indicated by the arrows in FIG. 4. When the free end 8 of the strip emerges from the end of the groove opposite to that in which it was initially inserted, said end of the strip can be grasped and pulled so that the larger-thickness part 10 of the strip will stretch and facilitate the entry of the thickened part 10 of the strip through the groove 4 and when released, will expand and closely conform in transverse size and shape to the interior of the groove, closely filling the same for its entire length and forming a perfect packing or sealing element for the upper half of the bearing. Any portions of the strip projecting out of the ends of the groove may then be cut off, leaving the groove 4 packed with sealing material for its length.

It will be understood that the part 10 of the strip 7 will be of such length that it will fill the groove 4 from end to end, and the leading end portion 6 of the strip is preferably long enough to cause its end 8 to be projected out of the groove just as the thicker part starts to enter the groove.

The placement of the sealing strip in the groove 4 is thus merely a matter of inserting the leading end of the strip through the groove until its forward extremity protrudes, then pulling on such end until the thicker part of the strip fills the groove and then cutting off any excess parts of the strip protruding beyond the ends of the groove.

Having thus described a single embodiment of the invention, it is obvious that the same is not to be restricted thereto, but is broad enough to cover all structures coming within the scope of the annexed claim.

What I claim is:

A seal for use in an inaccessible groove formed between a split bearing half and a shaft, said seal comprising a one-piece, elongated, resilient, plastic body which is longitudinally and transversely deformable, said body comprising an elongated leader portion and an elongated terminal sealing portion, said leader portion having a cross-section less than that of said sealing portion, said leader portion merging into said sealing portion from upper and lower side portions thereof whereby when the leader portion is threaded through an inaccessible groove in which the sealing portion is to be disposed, the merging portion between said leader and sealing portions and the adjacent portions of said sealing portion will be subjected to substantially uniformly applied tension as the movement of said sealing portion through said groove is resisted and the sealing portion is longitudinally and transversely deformed to readily pass into said groove and subsequently expands to fill said groove.

References Cited in the file of this patent

UNITED STATES PATENTS

| | | |
|---|---|---|
| 2,621,398 | Simmons | Dec. 16, 1952 |
| 2,914,038 | McKellar | Nov. 24, 1959 |

OTHER REFERENCES

"Notes on Teflon," published by the Plastics Sales Division, Polychemicals Department, E. I. du Pont de Nemours and Company, Inc., Wilmington, Del. (Copy in Div. 45), Patent Office stamped July 16, 1959.